US012585498B2

(12) United States Patent
Tummala et al.

(10) Patent No.: US 12,585,498 B2
(45) Date of Patent: Mar. 24, 2026

(54) MANAGING ALLOCATION OF RESOURCES FOR COMPUTER-IMPLEMENTED SERVICES IN DYNAMIC SYSTEMS

(71) Applicant: Dell Products L.P., Round Rock, TX (US)

(72) Inventors: Himabindu Tummala, South Grafton, MA (US); Anurag Sharma, Cedar Park, TX (US); Joseph B. Caisse, Burlington, MA (US); Brian Russell, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 904 days.

(21) Appl. No.: 17/725,254

(22) Filed: Apr. 20, 2022

(65) Prior Publication Data

US 2023/0342200 A1 Oct. 26, 2023

(51) Int. Cl.
*G06F 9/50* (2006.01)
*G06F 8/61* (2018.01)

(52) U.S. Cl.
CPC .............. *G06F 9/5005* (2013.01); *G06F 8/61* (2013.01); *G06F 2209/5014* (2013.01)

(58) Field of Classification Search
None
See application file for complete search history.

(56) References Cited

U.S. PATENT DOCUMENTS

2021/0360319 A1* 11/2021 Chari ................... H04L 12/2869
2022/0398078 A1* 12/2022 Segler ...................... G06F 8/30

* cited by examiner

*Primary Examiner* — Eric C Wai
(74) *Attorney, Agent, or Firm* — WOMBLE BOND DICKINSON (US) LLP

(57) ABSTRACT

Methods and systems managing services in a distributed system. The distributed system may include any number of deployments. The deployments may include edge systems, internet of things devices, and/or other types of devices that may have limited computing resource capabilities. The deployments may provide various computer implemented services. To reduce the change of the deployments being overloaded, resources for the various services hosted by the deployments may be reserved. To manage resources reservations, changes in services provided by the deployments may be implemented by deploying only those applications and/or features necessary to provide requested features. By doing so, a smaller quantity of resources for the deployed service may be reserved than would be reserved if a quantity of resources necessary for all of the potentially enabled features of the application were enabled. Information regarding the resource reservations may be published to facilitate consistent views within the system.

20 Claims, 9 Drawing Sheets

MANAGING ALLOCATION OF RESOURCES FOR COMPUTER-IMPLEMENTED SERVICES IN DYNAMIC SYSTEMS

FIELD OF THE DISCLOSED EMBODIMENTS

Embodiments disclosed herein relate generally to resource management. More particularly, embodiments disclosed herein relate to systems and methods for allocation of resources for services.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
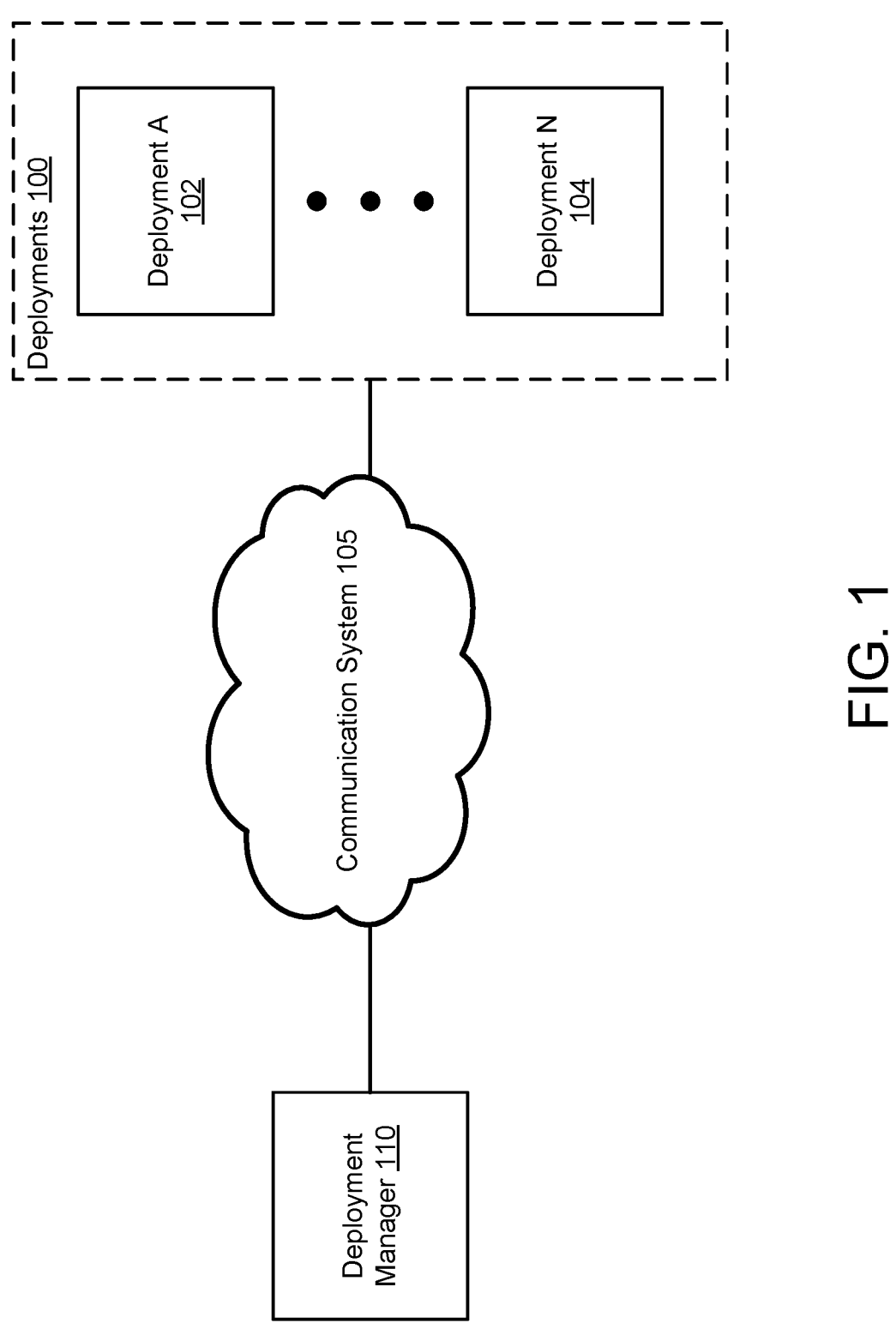
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing services in a distributed system. The distributed system may include any number of deployments. The deployments may include edge systems, internet of things devices, and/or other types of devices that may have limited computing resource capabilities.

The deployments may provide various computer implemented services. To reduce the change of the deployments being overloaded (e.g., too much demand for processing, memory, etc.), resources for the various services hosted by the deployments may be reserved.

To manage resources reservations, changes in services provided by the deployments may be implemented by deploying only those applications and/or features necessary to provide requested features. By doing so, a smaller quantity of resources for the deployed service may be reserved than would be reserved if a quantity of resources necessary for all of the potentially enabled features of the application were enabled.

To facilitate distributed decision making, the various devices of the distributed system may publish information that allows for a consistent view of each of the devices to be obtained. For example, when resources of a deployment are reserved for a service, information regarding the reservation may be published so that management entities may have a similar view of the available and unavailable (e.g., allocated) resources of the deployment.

By doing so, embodiments disclosed herein may facilitate the dynamic changes in services provided by deployments while limiting resource reservations. Consequently, the efficiency of use of limited hardware resources may be improved by improving availability of the hardware resources.

In an embodiment, a computer-implemented method for managing resources of deployment is provided. The method may include obtaining a service change request for a deployment of the deployments; identifying: a feature set to be enabled in a service based on the service change request, and a resource allocation based on the feature set, the feature set comprising a portion of available features for the service; making a determination, based on the resource allocation, that the deployment has sufficient available resources to support the service with the feature set; based on the determination: deploying the service with the feature set to the deployment; and reserving a portion of the available resources of the deployment based on the resource allocation.

Deploying the service with the set of features to the deployment may include instantiating an application on the deployment, the application comprising functionality to provide the feature set and lacking functionality to provide a second portion of the available features for the service.

The service with all of the available features may be associated with a quantity of resources, and the service with the feature set is associated with a portion of the quantity of resources.

The computer-implemented method may also include obtaining a service change request for the deployment, the service change request indicating an expansion of the feature set to comprise a feature of the available features of the service; identifying: a second resource allocation based on the expanded feature set, and the feature of the available features not being a member of the feature set; making a second determination, based on the second resource allocation, that the deployment has sufficient available resources to support the service with the expanded feature set; based on the second determination: modifying the service on the deployment based on the feature of the available features; and updating the reserved portion of the available resources of the deployment based on the second resource allocation.

The computer-implemented method may further include obtaining a service change request for the deployment, the service change request indicating an expansion of the feature set to comprise a feature of the available features of the service; identifying: a second resource allocation based on the expanded feature set, and the feature of the available features not being a member of the feature set; making a second determination, based on the second resource allocation, that the deployment has insufficient available resources to support the service with the expanded feature set; based on the second determination: performing an action set to service the service change request.

The action set may include initiating presentation of a graphical user interface to a requestor associated with the service change request, the graphical user interface indicating that insufficient resources are available for the feature of the available features.

Making the determination may include maintaining a record of services deployed to the deployment, resources of the deployment allocated to each of the services deployed to the deployment, and resources of the deployment allocated to workload performance; identifying the available resources based on the record; performing, for each resource type, a comparison of the available resources to the resource allocation to determine resource deficiencies for each of the resource types; and identifying that there are no resource deficiencies.

Maintaining the record may include receiving publications by the deployment, the publications indicating changes in the services deployed to the deployment.

The resource allocation may include a quantity of cache; and a number of threads.

The deployment comprises a computing device, the computing device being adapted to host applications to provide services, the service being one of the services, and the computing device comprising a fixed quantity of computing resources that define a type and quantity of the applications that may be hosted by the computing device without entering an overloaded state.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to deployments 100.

Deployments 100 may include any number of computing devices that provide the computer implemented services. For example, deployments 100 may include one or more deployments 102, 104 that may independently and/or cooperatively provide the computer implemented services.

For example, all, or a portion, of deployments 102-104 may provide computer implemented services to users and/or other computing devices operably connected to deployments 100. The computer implemented services may include any type and quantity of services including, for example, database services, instant messaging services, video conferencing services, etc. Different systems may provide similar and/or different computer implemented services.

To provide the computer implemented services, deployments 100 may host applications that provide these (and/or other) computer implemented services. Each of deployments 100 may include a quantity of hardware devices (e.g., processors, memory modules, etc.) that may provide computing resources (e.g., processing cycles, memory space, etc.) usable by applications hosted by deployments 100 to provide the computer implemented services.

Different applications may consume different quantities of computing resources. Further, similar applications may consume different quantities of computing resources depending on the activities provided by the respective applications. For example, some applications may have certain features enabled that may cause the applications to consume larger amounts of computing resources than other applications that do not have the features enabled. Due to the limited quantity of hardware devices, and corresponding computing resources, each of deployments 100 may have a limited capacity for hosting various applications.

Any of the deployments may include any number of computing devices which may operate as a distributed system to provide the computer implemented services. Consequently, a deployment may have an aggregate capacity for hosting applications based on the characteristics of the member computing devices.

If a quantity of applications is deployed to one of deployments 100 that exceeds its hosting capacity, the computer implemented services provided by the deployment may be impaired. For example, the computer implemented services may not be provided nominally due to lack of computing resources. Likewise, if an already deployed application is modified in a manner that increases its resource consumption rate (such that the capacity of the host deployment is exceeded), then the computer implemented services provided by the deployment may be similarly impaired.

To reduce the likelihood of impairment of computer implemented services occurring, quantity of the computing resources of the deployments may be reserved such that additional deployments of applications or modifications of existing applications to consume additional computing resource may be reduced. However, if the quantity of resources of a deployment that is reserved (e.g., for an application) exceeds the quantity necessary for a particular service (e.g., implemented with one or more applications), then the deployment may not use all of its resources for providing computer implemented services. Doing so may impair the quantity and/or quality of computer implemented services provided by the deployment (e.g., when compared to the quantity and/or quality of computer implemented services provided if all of the resources of the deployment are utilized for the services).

In general, embodiments disclosed herein relate to systems, methods, and devices for managing resources of deployments. To manage the resources of the deployment, a system may include deployment manager 110.

Deployment manager 110 may (i) obtain service change requests (e.g., to add new services or modify existing services, (ii) identify only those features of a service necessary to meet the change requests, (iii) based on the necessary features, identify resource consumption by the service, (iv) identify whether a deployment has sufficient resources to meet the identified resource consumption, (v)

deploy the service with only the necessary features to deployments that have sufficient available resources, and reserve only a portion of the available resources of the deployment based on the identified resource consumption, and (vi) perform action sets to address deployments that have insufficient available resources for the service. By doing so, deployment manager 110 may reduce the likelihood of overloading a deployment through service deployment, increase a utilization rate of resources of deployments by reducing the likelihood of over reserving resources of the deployment, and reduce the cognitive burden on administrators tasked with making deployment decisions through presentation of graphical user interfaces that indicate the capacity for various deployments to host various services with varying features.

Figure 2:
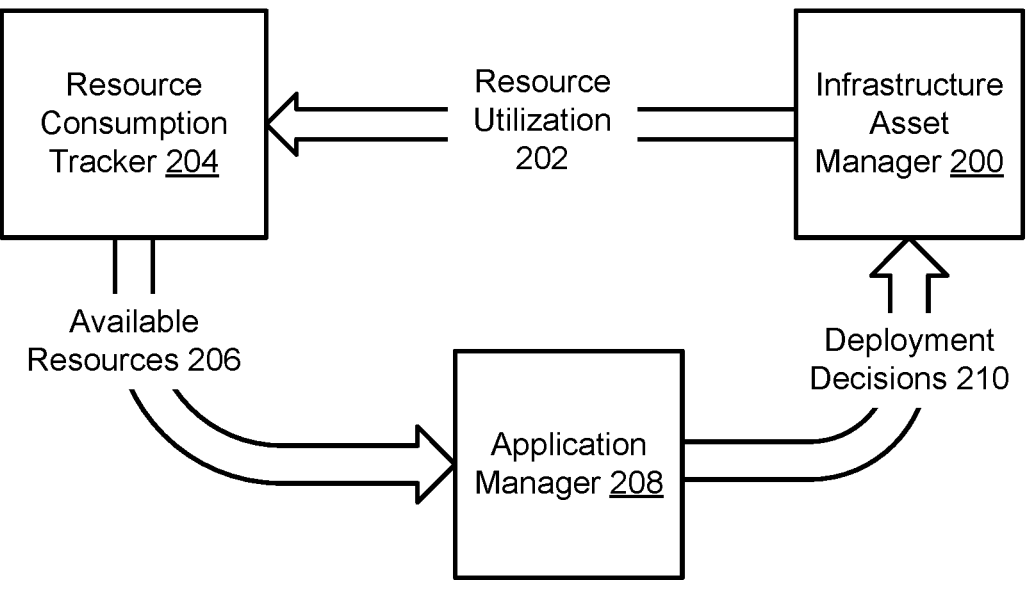
FIG. 2 shows a block diagram illustrating data flows in accordance with an embodiment.

To provide the above noted functionality, the system of FIG. 1 may implement a publication system through which information regarding (i) deployed services, (ii) resource availabilities, and/or (iii) service compatibilities are shared. For example, any of the components of FIG. 1 may host a distributed service through which such information is collected and published to share it between these components. Refer to FIG. 2 for additional details regarding publication and use of the published information.

Any of deployment manager 110 and deployments 100 may be implemented using a data processing system (e.g., a computing device) such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding data processing systems, refer to FIG. 5.

Any of deployment manager 110 and deployments 100 may be implemented with multiple data processing systems. The data processing systems may form a distributed system operably connected via one or more networks. The distributed system may implement a control plane with may manage the operation of the data processing systems to provide the functionality of a deployment. The control plane may be implemented with any number of applications hosted by the data processing systems.

The functionality of deployment manager 110 may be performed, in part, as a shared service (e.g., distributed application). For example, the shared service may include agents hosted by deployments 100 which may cooperate with deployment manager 110 to management service deployment and information publication across the system.

Figure 3A:
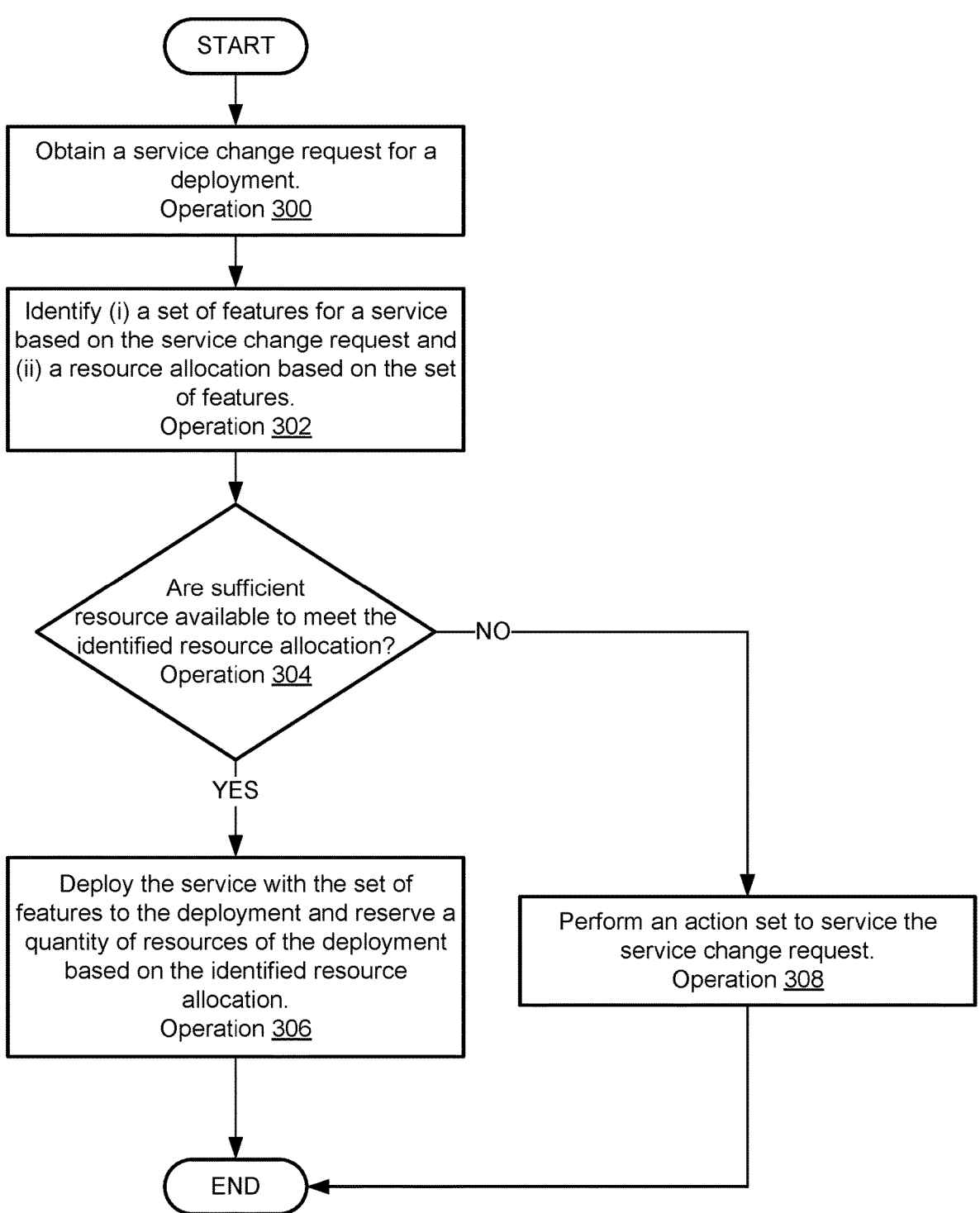
FIG. 3A shows a flow diagram illustrating a method of processing service change requests in accordance with an embodiment.
Figure 3B:
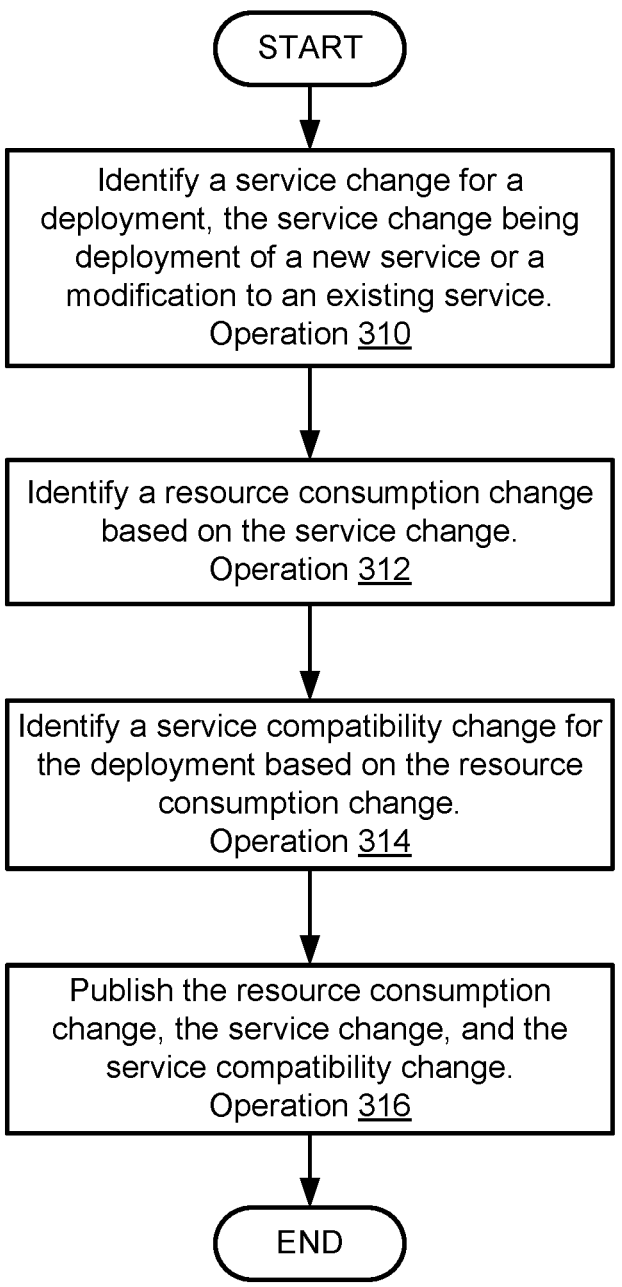
FIG. 3B shows a flow diagram illustrating a method of publishing information in accordance with an embodiment.

Deployment manager 110 and/or deployments 100 may perform all, or a portion, of the methods illustrated in FIGS. 3A-3B.

While illustrated in FIG. 1 as included a limited number of specific components, a data processing system in accordance with an embodiment may include fewer, additional, and/or different components than those illustrated therein.

As discussed above, the system of FIG. 1 may manage the resources of deployments to facilitate increased utilization and avoid over utilization. To do so, the components of FIG. 1 may host various entities through which information regarding the operation of components of the system may be exchanged and used for management purposes.

Turning to FIG. 2, a block diagram of illustrating entities hosted by the system of FIG. 1 in accordance with an embodiment is shown. Any of the entities shown in FIG. 2 may be implemented with any combination of hardware devices and/or software (e.g., applications hosted by the hardware devices). The entities may include infrastructure asset manager 200, resource consumption tracker 204, and application manager 208. Each of these entities is discussed below.

Infrastructure asset manager 200 may manage the resources and services of deployments. To provide its functionality, infrastructure asset manager 200 may (i) identify resources usable to provide services (and/or total resources), (ii) identify (and/or facilitate deployment of/modification of) services provided by a deployment, and/or (iii) identify resources reserved for the services at a granular level (e.g., per feature level). Infrastructure asset manager 200 may publish this information through reports of resource utilization 202 to other components. The reporting may be implemented via any reporting method (e.g., message based methods, publish-subscribe based methods, etc.) without departing from embodiments disclosed herein.

In an embodiment, infrastructure asset manager 200 maintains a listing (e.g., records) of each deployed service and corresponding features. The listing may also include resources of the deployment reserved for the service (e.g., its core function, which may be implemented with an application) and the respective features (e.g., application components/modules/etc.). The listing may also indicate the types and quantities of each type of reserved resources.

Resource consumption tracker 204 may track resource utilization by deployments. To provide its functionality, resource consumption tracker 204 may (i) obtain resource utilization reports for any number of deployments, and/or (ii) generate records reflecting the available and/or total resources of the deployments. Resource consumption tracker 204 may publish this information through reports of available resources 206 to other components. The reporting may be implemented via any reporting method (e.g., message based methods, publish-subscribe based methods, etc.) without departing from embodiments disclosed herein.

In an embodiment, resource consumption tracker 204 maintains a listing of the resources of each deployment that are reserved, the resources that may be reserved if all features of services deployed to the deployment are enabled (e.g., through deployment of additional application modules), and/or information regarding free resources (e.g., allocable resources) of each of the deployments. The listing may also indicate the types and quantities of each type of resource.

Application manager 208 may make service deployment decisions for deployments. To provide its functionality, application manager 208 may (i) obtain available resources reports for a deployment, (ii) identify whether the deployment has sufficient resources to host a service with some number of features using the resource reports, (iii) deploy the services when the deployment has sufficient resources, and/or (iv) take remedial action when the deployment does not have sufficient resources. Application manager 208 may deploy services through deployment decisions 210. Deployment decisions 210 may indicate how and when services are to be deployed, and may be included as part of an application installer that manages which features of a service are installed at the time of service deployment. The application installer may only install a select number of components for an application that provides the service. The components may correspond to the features for the service, while components for other features may not be installed. Through this process, only a limited number of components may be deployed to provide a service, thereby right-sizing the deployed application. Deployment decisions 210 may be used by infrastructure asset manager 200 to update the information that it maintains regarding the deployment.

In an embodiment, application manager 208 maintains a listing of the services and enabled features deployed to the deployments, the quantity of resources of the deployments reserved for the services/features, and/or information regarding free resources (e.g., allocable resources) of each of the deployments. The listing may also indicate the types and quantities of each type of resource.

In an embodiment, application manager 208 maintains a lookup data structures such as a lookup table. The lookup data structure may be populated with identifiers of services and/or features, and resource consumptions associated with the services and/or features. Thus, the resource consumption for a service or feature thereof may be obtained by performing a lookup using an identifier of the service/feature.

Generally, resource consumption tracker 204 and application manager 208 may be hosted by a deployment manager while infrastructure asset manager 200 may generally be hosted by respective deployments. However, these entities may be implemented as distributed services hosted (e.g., distributed applications) by any number of the components of FIG. 1 (and/or other components not shown therein).

In addition to the information discussed above, the system of FIG. 1 may also track various workloads being performed by the respective deployments. This information may be dynamically tracked and taken into account when making deployment decision. Further, this information may be used to make predictive decisions such as likely future resource needs for deployments. This information may be used when making deployment decisions, and/or for other types of workload management decisions such as when and where to deploy workloads that may impact deployed services. By doing so, the consistent view of the distributed system may be further enhanced such that control decisions from various actors may take into account the operation of the other components of the distributed system, and their future likely needs. For example, this information may be used to make recommendation for the types of workloads that may be placed with the respective deployments. The workload types may include processor intensive (for deployments that have excess processing resources available), memory intensive (for deployments that have excess memory resources available, short term (for deployments that are currently not busy but that may have workloads schedules in the future), etc.

As discussed above, the components of FIG. 1 may perform various methods to manage resources and deploy services to provide computer implemented services. FIGS. 3A-3B illustrates examples of methods that may be performed by the components of FIG. 1 when providing their functionalities. In the diagrams discussed below and shown in FIGS. 3A-3B, any of the operations may be repeated, performed in different orders, and/or performed in a parallel with other operations and/or a partially overlapping in time manner with other operations.

Turning to FIG. 3A, a flow diagram illustrating a method of processing a service change request in accordance with an embodiment is shown. The method may be performed by a data processing system, portions thereof, or another entity. The data processing system may be a portion of a deployment, a deployment manager, or another entity.

At operation 300, a service change request for a deployment is obtained. The service change request may be obtained from another device such as a personal computing device used by an administrator or other person. The service changed request may be obtained from other entities such as an automated management system without departing from embodiments disclosed herein.

The service change request may request a change to services provided by the deployment. The service change request may include one or more of: (i) adding a new service, (ii) removing a service, and (iii) modifying a deployed service to expand or reduce its features.

At operation 302, a set of features for a service are identified based on the service change request. A resource allocation based on the set of features may also be identified.

The set of features may be identified based on information included in the service change request. For example, the service change request may indicate the type of request (e.g., add, remove, or modify), whether it is a service level change (e.g., addition/removal), and features impacted by the service change.

The resource allocation may be identified by (i) performing a lookup (e.g., using a lookup data structure, refer to FIG. 2) to identify resource consumptions for the service and/or features, and (ii) aggregating the resource consumptions for the service and/or features. The resource allocation may reflect the increased or decreased quantity of resources for implementing the service change with the set of features (e.g., rather than all available features).

The resource allocation may specify, for example, quantities of threads, quantities of cache space, quantities of processing resources, quantities of memory resources, quantities of storage, quantities of communication resources, and/or any other types of resources that may need to be available for the service to operate nominally or for as designed to have access.

At operation 304, it is determined whether the deployment has sufficient resources available to meet the identified resource allocation. For service change requests indicating reduction in services/features, it may be determined that there are sufficient resources available. For service change requests indicating increases in services/features, the determination may be made by comparing the identified resource allocation to the allocable resources (e.g., not reserved) of the deployment. If the comparison indicates that there are sufficient allocable resources (e.g., of each type) to meet the need of the resource allocation (e.g., the respective quantities of each type of resource), then it may be determined that there are sufficient resources available to meet the identified resource allocation.

If there are sufficient resources to meet the identified resources allocation, then the method may proceed to operation 306. Otherwise the method may proceed to operation 308.

At operation 306, the service is deployed with the set of features to the deployment, and a quantity of resources of the deployment are reserved based on the identified resources.

In an embodiment, the service is deployed by instantiating an application on the deployment, the application may include functionality to provide the feature set and lack functionality to provide a second portion of the available features (e.g., others not identified in operation 302) for the service. The application may be deployed by sending instructions to the deployment, or a corresponding control plane that manages the deployment.

In an embodiment, the service is deployed by modifying an existing service by adding or removing features based on the feature set. The features may be added or removed by adding or removing application modules or other types of applications. The application modules/applications may be added or removed by sending instructions to the deployment, or a corresponding control plane that manages the deployment.

In an embodiment, the service is deployed by removing an application from the deployment, the application may include functionality to provide the feature set and lack functionality to provide a second portion of the available features (e.g., others not identified in operation 302) for the service.

In an embodiment, the quantity of resources of the deployment are reserved by generating or modifying records (e.g., lists/tables/etc.) in which reservations are stored. The records may be stored with the deployment or in other locations. The records may reflect the change in resources due to the change in services and/or features thereof. For example, the resource allocation may be used to indicate that increased or decreased quantities of resources are available or reserved.

The method may end following operation 306.

Returning to operation 304, the method may proceed to operation 308 following operation 304 when it is determined that there are insufficient resources available to meet the identified resource allocations.

At operation 308, an action set is performed to service the service change request. The action set may include any quantity and type of actions.

In an embodiment, the actions include generating and presenting a graphical user interface. The graphical user interface may include information regarding available resources, deployed services, and compatibilities between a deployment and available services/functions. The compatibilities may be based on the available resources and the resource consumptions for services and/or function not yet deployed. The graphical user interface may include interface elements that allow a user to select or otherwise provide user input to indicate if any of the compatible services/features should be implemented. If such user input is provided, the method may return to operation 300 and treat the user input as a service change request.

The graphical user interface may also include representations of reasons why certain services/features are unavailable for deployments. For example, the graphical user interface may indicate certain quantities of resources that are not available, but required, for deployment of services/features.

Figure 4A:
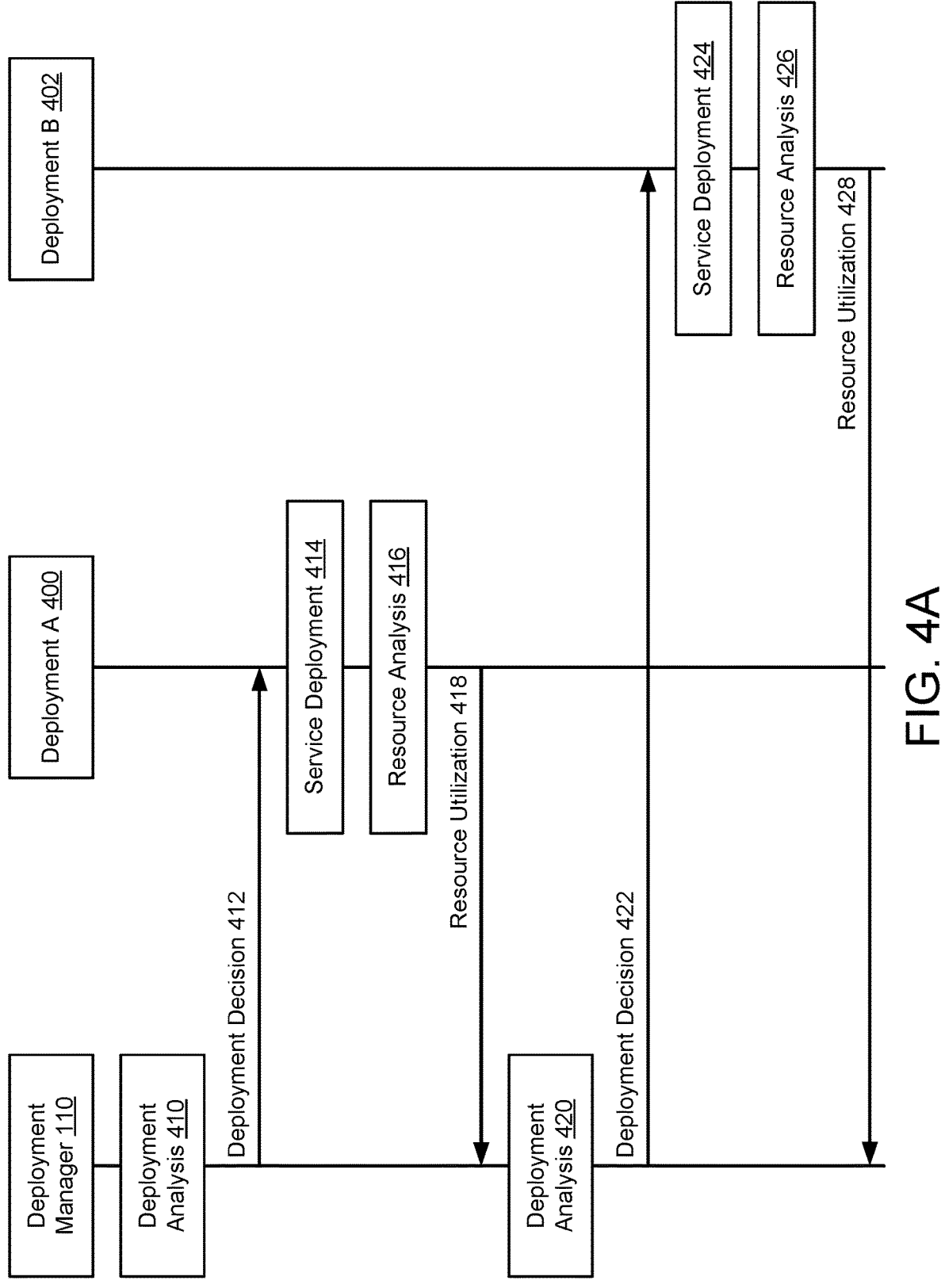
FIGS. 4A-4C show diagrams illustrating actions performed by and/or interactions between components of a system in accordance with an embodiment.
Figure 4B:
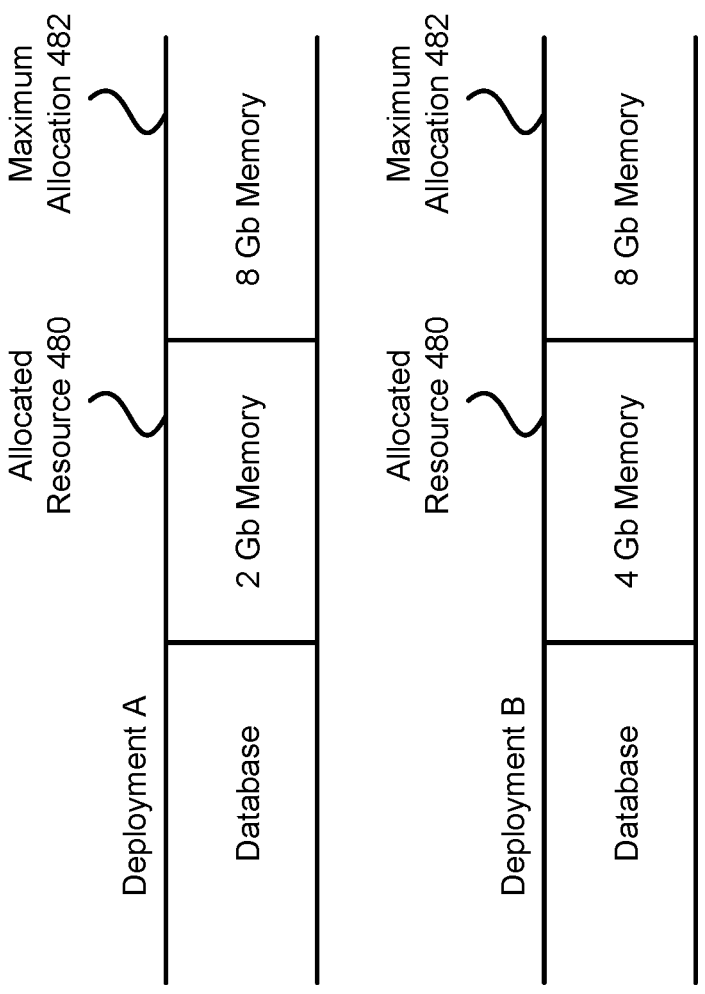
Figure 4C:
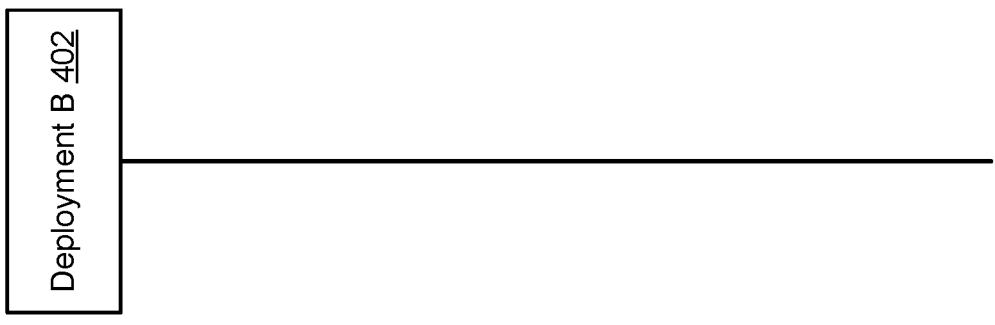
Figure 4C:
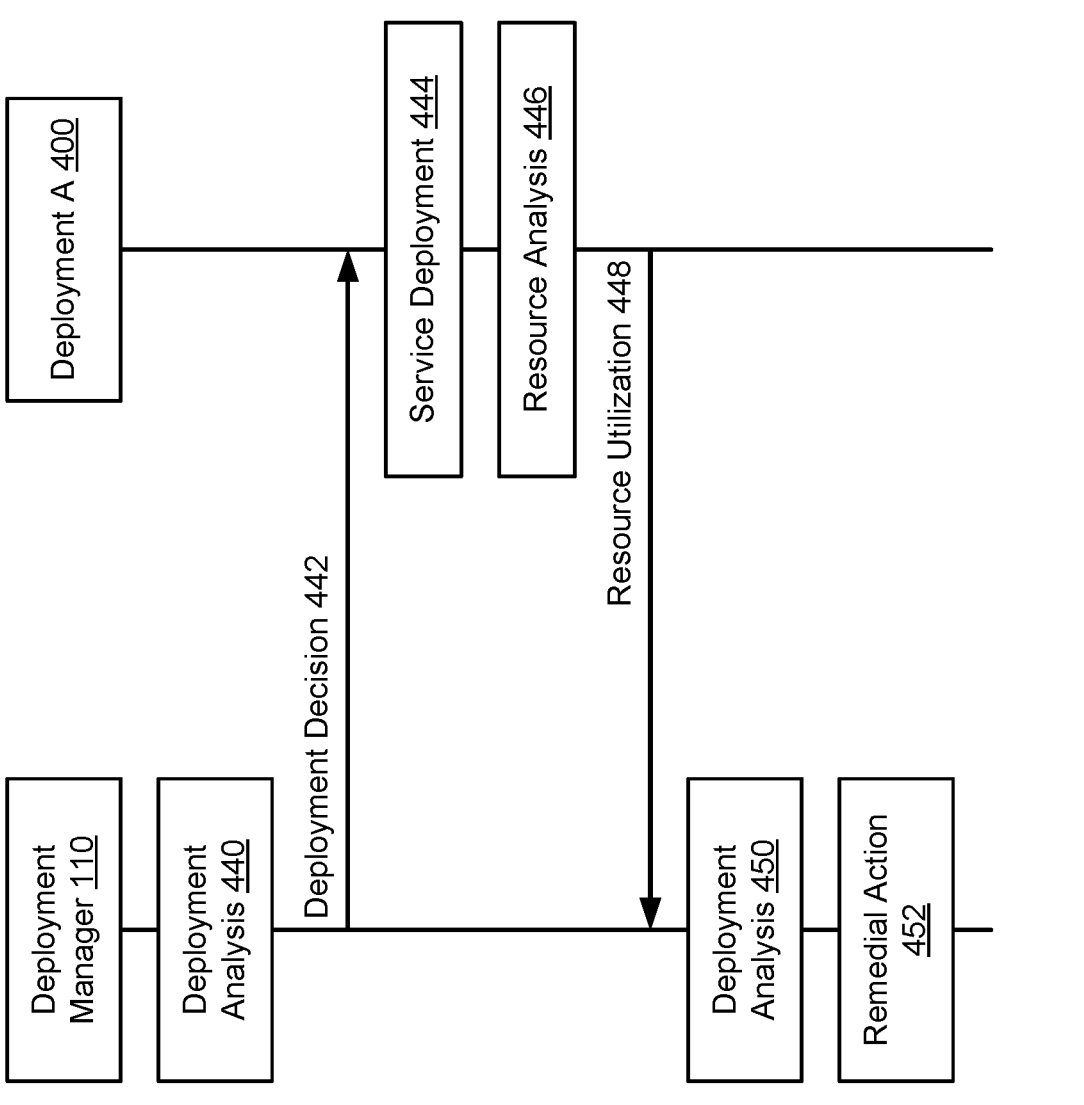
Figure 4D:
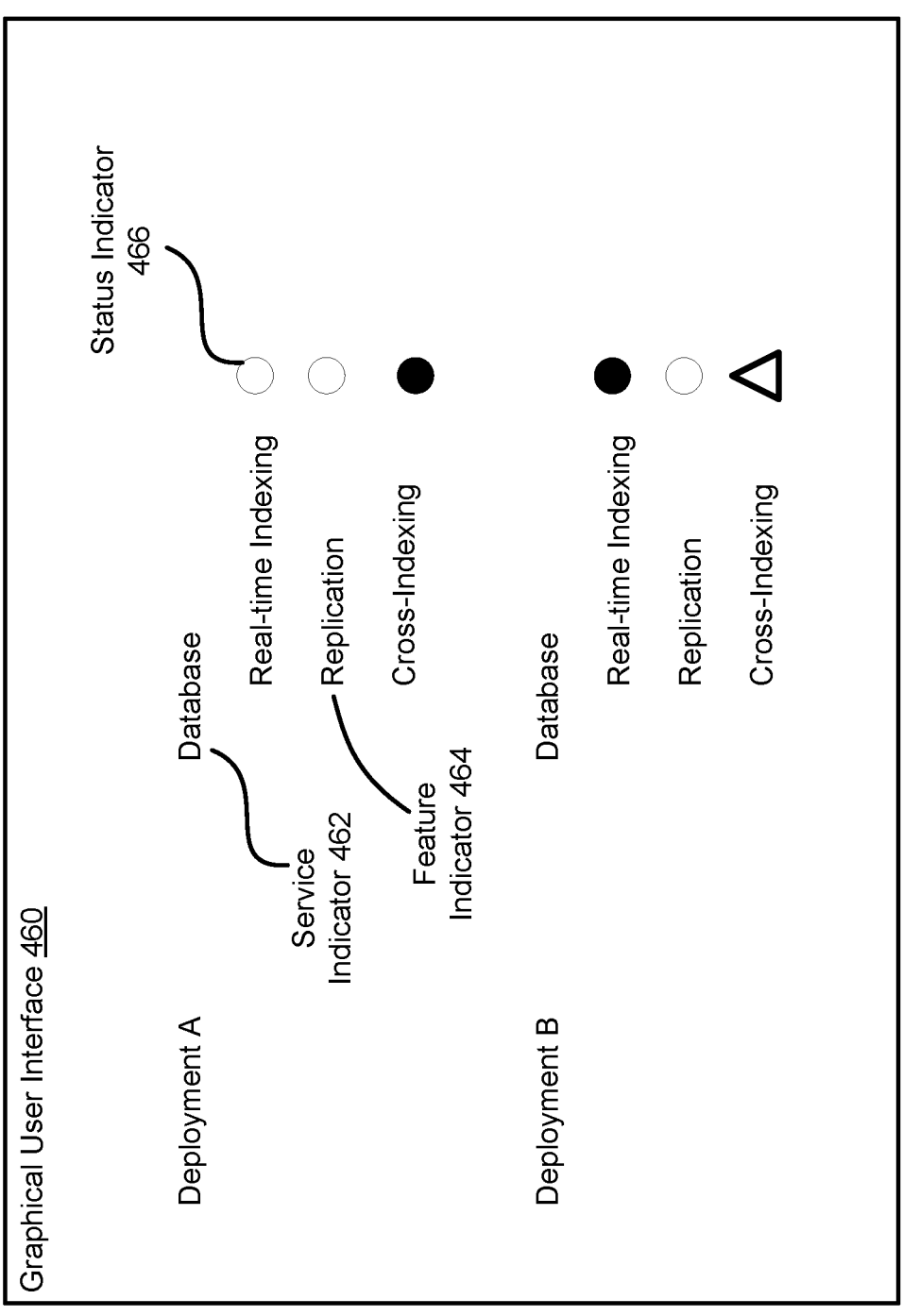
FIG. 4D shows a diagram illustrating a graphical user interface in accordance with an embodiment.

Refer to FIG. 4D for additional details regarding graphical user interfaces.

The method may end following operation 308.

Using the method illustrated in FIG. 3A, services and resources of deployments may be managed in a manner that increases the efficiency of resource use while reducing the likelihood of overloading the deployment.

Turning to FIG. 3B, a flow diagram illustrating a method of managing service changes in accordance with an embodiment is shown. The method may be performed by a data processing system, portions thereof, or another entity. The data processing system may be a portion of a deployment, a deployment manager, or another entity.

At operation 310, a service change for a deployment is identified. The service change may be a deployment of a new services, or a modification of an existing service. The service change may be received from a deployment manager.

At operation 312, a resource consumption change based on the service change is identified. The resource consumption change may be identified based on a quantity of resources reserved or released when the service change is serviced through deployment (addition, removal modification) of applications, features, or portions thereof.

At operation 314, a service compatibility change for the deployment is identified based on the resource consumption change. The service compatibility change may be identified by performing a lookup to identify all of the services/features for which the deployment has sufficient allocable resources after the service change is serviced. The identified services/features may be the new service/feature compatibility of the deployment.

At operation 316, the resource consumption change, the service change, and/or the service compatibility change is published. These changes may be published by providing the components of FIG. 1 with information regarding these changes such that the components have a consistent view of the capabilities of the deployment.

The method may end following operation 316.

Using the method illustrated in FIG. 4B, embodiments disclosed herein may facilitate distributed control of the system of FIG. 1 by ensuring that the actors in the system have a consistent of deployments.

To further clarify embodiments disclosed herein, now consider an example scenario as illustrated in FIGS. 4A-4D in which a business operates deployment A 400 for front end operations and deployment B 402 for backend operations. Due to the difference in roles but similar owners, both deployments may need to provide similar services but may need access to different features. To do so, the system may be operated in accordance with embodiments disclosed in FIGS. 1-3B.

Turning to FIGS. 4A-4D, diagrams illustrating actions that may be performed by components of a system similar to that of FIG. 1 in accordance with an embodiment is shown. In FIGS. 4A-4C, actions performed by various components and interactions between components (e.g., data transmissions) are shown. The actions performed by the respective components are shown with boxes in alignment with the line descending from the box representing the respective component of the system. Interactions between components are illustrated with arrows interconnecting the lines descending from the boxes. Generally, the actions and interactions are ordered as may be performed in a temporal order with earlier actions/interactions being towards the top of the page and later performed actions/interactions being towards the bottom of the page. The actions/interactions may be performed in other orders.

To manage the deployments 400, 402, deployment manager 110 may receive a request from an operator requesting that a database be deployed to both deployments. However, the request may also indicate that deployment B 402 may be more heavily utilized and may require a real-time indexing feature which is not needed for the use of the database for deployment A 400.

In response, deployment manager 110 may perform deployment analysis 410 with respect to deployment A 400 to obtain deployment decision 412. Deployment decision 412 may indicate that only the base database needs to be deployed to deployment A 400. Consequently, after deployment decision 412 is send to deployment A 400, only an application for the database without any modules corresponding to different features may be deployed. For example, deployment A 400 may perform service deployment 414 in which the binaries for the application are obtained (from any source), stored in deployment A 400, and set for execution. Because only the base application is instantiated, when deployment A 400 performs resource analysis 416, it is determined that only 2 gigabytes of memory must be reserved. Accordingly, deployment A 400 only reserves 2 gigabytes of memory. In contrast, if all of the features of the database were enabled, 8 gigabytes of memory may be reserved. Thus, in this scenario, analysis 410, and deployment 414 reduce the quantity of reserved resources when compared to a worst case scenario reservation which may result in as many resources as would be necessary for all features of the service to be enabled. Consequently, when deployment A 400 generates and sends resource utilization 418 to deployment manager 110, only 2 gigabytes of memory is reported as being reserved.

Deployment manager 110 may perform deployment analysis 420 with respect to deployment B 402 to obtain deployment decision 422. Deployment decision 422 may indicate that the base database and the real-time indexing feature needs to be deployed to deployment B 402. Consequently, after deployment decision 422 is send to deployment B 402, an application for the database with the real-time indexing module enabled may be deployed. For example, deployment B 402 may service deployment 424 in which the binaries for the application are obtained (from any source), stored in deployment B 402, and set for execution including the real-time indexing feature. Because the base application is instantiated with the feature enabled, when deployment B 402 performs resource analysis 426, it is determined that 4 gigabytes of memory must be reserved. Accordingly, deployment B 402 reserves 4 gigabytes of memory. In contrast, if all of the features of the database were enabled, 8 gigabytes of memory may be reserved. Thus, in this scenario, analysis 420, and deployment 424 reduce the quantity of reserved resources when compared to a worst case scenario reservation which may result in as many resources as would be necessary for all features of the service to be enabled. Consequently, when deployment B 402 generates and sends resource utilization 428 to deployment manager 110, 4 gigabytes of memory is reported as being reserved.

Turning to FIG. 4B, a diagram illustrating the reservations for the deployments in accordance with an embodiment is shown. As seen, for both deployments, different fields corresponding to allocated resources 480 and a maximum allocation 482 of resources of the data base instances on both databases is recorded. These records may be used, for example, when determining whether various new services or features of existing services may be enabled so as to not overload the deployments.

Turning to FIG. 4C, returning to the scenario discussed with respect to FIG. 4C, now consider when, at later point in time, an operator of the deployments 400, 402 wishes to expand the use of the databases with other databases. To do so, the user may send a service change request to deployment manager 110 indicating the request. Deployment manager 110 may identify that to do so, a cross-indexing features of the existing databases may need to be enabled to service this request.

In response, deployment manager 110 may perform deployment analysis 440 with respect to deployment A 400 to obtain deployment decision 442. Deployment analysis 440 may compare a quantity of memory necessary for deployment of the cross-indexing feature, which may be 6 gigabytes, to a quantity of allocable memory of deployment A 400, in this case also 6 gigabytes. Deployment decision 442 may indicate that the cross indexing feature can and is to be enabled because deployment A 400 has sufficient allocable memory resources to support the feature. Consequently, after deployment decision 442 is send to deployment A 400, the cross-indexing feature is enabled (e.g., through configuration or deploying addition application modules). When deployment A 400 performs resource analysis 446, it is determined that 8 gigabytes of memory must be reserved. Accordingly, deployment A 400 reserves 8 gigabytes of memory. Accordingly, when deployment A 400 generates and sends resource utilization 448 to deployment manager 110, 8 gigabytes of memory is reported as being reserved with no more available.

Deployment manager 110 may perform deployment analysis 450 with respect to deployment B 402. Deployment analysis 450 may compare a quantity of memory necessary for deployment of the cross-indexing feature, which may be 6 gigabytes, to a quantity of allocable memory of deployment B 402, in this case only 4 gigabytes due to the already enabled real-time indexing feature. Accordingly, rather than making a deployment decision, deployment manager 110 may take remedial action 452 because enabling the cross indexing feature may result in deployment B 402 being computationally overloaded. The remediation action 452 may include, for example, using a graphical user interface to inform a person of the situation and obtain feedback on how to address the situation.

Turning to FIG. 4D, a diagram of graphical user interface 460 in accordance with an embodiment is shown. Graphical user interface 460 may be implemented with a template that includes fields that may be populated with information from records. The populated information may allow person to understand why a request has not been fulfilled and allow the person to provide input to resolve the situation.

Graphical user interface 460 may include fields that indicate the services and features that are deployed, available for deployment, and that are unavailable for deployment. For example, graphical user interface 460 may include one or more service indicator 462 indicating services. These service indicators may be associated with respective deployments by virtue of their respective locations on the graphical user interface 460.

Graphical user interface 460 may also include fields that indicate the features of the services. For example, graphical user interface 460 may include one or more feature indicator 464 indicating features for the services indicated by the one or more service indicator 462. These field indicators may be associated with respective services by virtue of their respective locations on the graphical user interface 460.

Graphical user interface 460 may also include fields that indicate the status of the services/features. For example, graphical user interface 460 may include one or more status indicator 466 indicating whether a corresponding service or features is (i) deployed, (ii) available for deployment, and/or (iii) unavailable for deployment (e.g., due to lack of allocable resources). These field indicators may be associated with respective services/features by virtue of their respective locations on the graphical user interface 460.

The status indicators may include shapes/colors/fills or other appearances that indicate the statuses of the associated services/features. For example, in FIG. 4D, deployed features are indicated with filled circles, available for deployment features are indicated with unfilled circles, and unavailable features for deployment are indicated with unfilled triangles.

Thus, through this interface, the person may identify that the cross-indexing feature may not be deployed to deployment B for lack of allocable resources. However, if the user wished to deploy the replication feature instead or remove the real-time indexing feature, the user may do so by selecting these fields which may trigger a confirmation prompt. If confirmed, the user input may be treated as a service change request.

Figure 5:
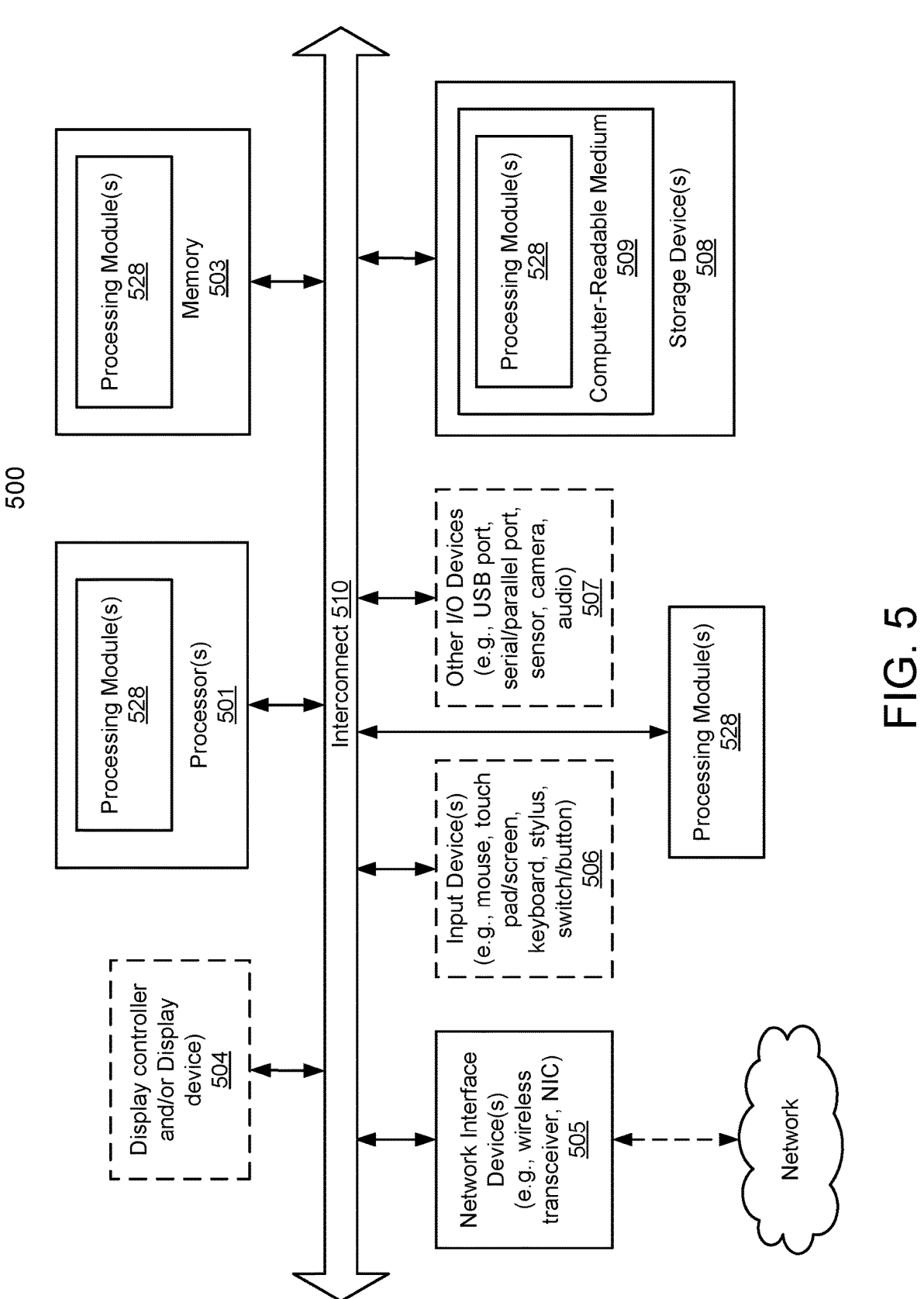
FIG. 5 shows a block diagram illustrating a data processing system in accordance with an embodiment.

Any of the components illustrated in FIGS. 1-4D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor

501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing resources of deployments, the method comprising:
obtaining a service change request for a deployment of the deployments;
identifying a feature set to be enabled in a service based on the service change request;
identifying at least one expanded feature of the feature set, the at least one expanded feature being additional to features enabled in the service prior to receiving the service change request, and the feature set comprising a portion of available features for the service;
obtaining, based on the at least one expanded feature, a resource allocation, the resource allocation comprising a larger quantity of resources than a resource allocation associated with the features enabled in the service prior to receiving the service change request;

making a determination, based on the resource allocation, that the deployment has sufficient available resources to support the service with the feature set;

based on the determination:

deploying the service with the feature set to the deployment; and reserving a portion of the available resources of the deployment based on the resource allocation.

2. The computer-implemented method of claim 1, wherein deploying the service with the set of features to the deployment comprises:

instantiating an application on the deployment, the application comprising functionality to provide the feature set and lacking functionality to provide a second portion of the available features for the service.

3. The computer-implemented method of claim 2, wherein the service with all of the available features is associated with a quantity of resources, and the service with the feature set is associated with a portion of the quantity of resources, the portion of the quantity of resources being less than the quantity of resources.

4. The computer-implemented method of claim 3, further comprising:

obtaining a service change request for the deployment, the service change request indicating an expansion of the feature set to comprise a feature of the available features of the service;

identifying:

a second resource allocation based on the expanded feature set, and the feature of the available features not being a member of the feature set;

making a second determination, based on the second resource allocation, that the deployment has sufficient available resources to support the service with the expanded feature set;

based on the second determination:

modifying the service on the deployment based on the feature of the available features; and updating the reserved portion of the available resources of the deployment based on the second resource allocation.

5. The computer-implemented method of claim 3, further comprising:

obtaining a service change request for the deployment, the service change request indicating an expansion of the feature set to comprise a feature of the available features of the service;

identifying:

a second resource allocation based on the expanded feature set, and the feature of the available features not being a member of the feature set;

making a second determination, based on the second resource allocation, that the deployment has insufficient available resources to support the service with the expanded feature set; and based on the second determination:

performing an action set to service the service change request.

6. The computer-implemented method of claim 5, wherein the action set comprises:

initiating presentation of a graphical user interface to a requestor associated with the service change request, the graphical user interface indicating that insufficient resources are available for the feature of the available features.

7. The computer-implemented method of claim 1, wherein making the determination comprises:

maintaining a record of services deployed to the deployment, resources of the deployment allocated to each of the services deployed to the deployment, and resources of the deployment allocated to workload performance;

identifying the available resources based on the record;

performing, for each resource type, a comparison of the available resources to the resource allocation to determine resource deficiencies for each of the resource types; and identifying that there are no resource deficiencies.

8. The computer-implemented method of claim 7, wherein maintaining the record comprises:

receiving publications by the deployment, the publications indicating changes in the services deployed to the deployment.

9. The computer-implemented method of claim 1, wherein the resource allocation comprises:

a quantity of cache; and a number of threads.

10. The computer-implemented method of claim 1, wherein the deployment comprises a computing device, the computing device being adapted to host applications to provide services, the service being one of the services, and the computing device comprising a fixed quantity of computing resources that define a type and quantity of the applications that may be hosted by the computing device without entering an overloaded state.

11. The method of claim 1, wherein the feature set comprises a subset of the available features for the service.

12. A non-transitory machine-readable medium having instructions stored therein, which when executed by a processor, cause the processor to perform operations for managing resources of deployments, the operations comprising:

obtaining a service change request for a deployment of the deployments;

identifying a feature set to be enabled in a service based on the service change request;

identifying at least one expanded feature of the feature set, the at least one expanded feature being additional to features enabled in the service prior to receiving the service change request, and the feature set comprising a portion of available features for the service;

obtaining, based on the at least one expanded feature, a resource allocation, the resource allocation comprising a larger quantity of resources than a resource allocation associated with the features enabled in the service prior to receiving the service change request;

making a determination, based on the resource allocation, that the deployment has sufficient available resources to support the service with the feature set;

based on the determination:

deploying the service with the feature set to the deployment; and reserving a portion of the available resources of the deployment based on the resource allocation.

13. The non-transitory machine-readable medium of claim 12, wherein deploying the service with the set of features to the deployment comprises:

instantiating an application on the deployment, the application comprising functionality to provide the feature set and lacking functionality to provide a second portion of the available features for the service.

14. The non-transitory machine-readable medium of claim 13, wherein the service with all of the available features is associated with a quantity of resources, and the service with the feature set is associated with a portion of the quantity of resources, the portion of the quantity of resources being less than the quantity of resources.

15. The non-transitory machine-readable medium of claim 14, wherein the operations further comprise:

obtaining a service change request for the deployment, the service change request indicating an expansion of the feature set to comprise a feature of the available features of the service;

identifying:

a second resource allocation based on the expanded feature set, and the feature of the available features not being a member of the feature set;

making a second determination, based on the second resource allocation, that the deployment has sufficient available resources to support the service with the expanded feature set;

based on the second determination:

modifying the service on the deployment based on the feature of the available features; and updating the reserved portion of the available resources of the deployment based on the second resource allocation.

16. The non-transitory machine-readable medium of claim 12, wherein the feature set comprises a subset of the available features for the service.

17. A data processing system, comprising:

a processor; and a memory coupled to the processor to store instructions, which when executed by the processor, cause the processor to perform operations for managing resources of deployments, the operations comprising:

obtaining a service change request for a deployment of the deployments;

identifying a feature set to be enabled in a service based on the service change request;

identifying at least one expanded feature of the feature set, the at least one expanded feature being additional to features enabled in the service prior to receiving the service change request, and the feature set comprising a portion of available features for the service;

obtaining, based on the at least one expanded feature, a resource allocation, the resource allocation comprising a larger quantity of resources than a resource allocation associated with the features enabled in the service prior to receiving the service change request;

making a determination, based on the resource allocation, that the deployment has sufficient available resources to support the service with the feature set;

based on the determination:

deploying the service with the feature set to the deployment; and reserving a portion of the available resources of the deployment based on the resource allocation.

18. The data processing system of claim 17, wherein deploying the service with the set of features to the deployment comprises:

instantiating an application on the deployment, the application comprising functionality to provide the feature set and lacking functionality to provide a second portion of the available features for the service.

19. The data processing system of claim 18, wherein the service with all of the available features is associated with a quantity of resources, and the service with the feature set is associated with a portion of the quantity of resources, the portion of the quantity of resources being less than the quantity of resources.

20. The data processing system of claim 19, wherein the operations further comprise:

obtaining a service change request for the deployment, the service change request indicating an expansion of the feature set to comprise a feature of the available features of the service;

identifying:

a second resource allocation based on the expanded feature set, and the feature of the available features not being a member of the feature set;

making a second determination, based on the second resource allocation, that the deployment has sufficient available resources to support the service with the expanded feature set;

based on the second determination:

modifying the service on the deployment based on the feature of the available features; and updating the reserved portion of the available resources of the deployment based on the second resource allocation.

* * * * *